US007467289B1

(12) United States Patent
Garlick et al.

(10) Patent No.: US 7,467,289 B1
(45) Date of Patent: Dec. 16, 2008

(54) INDICATING ACKNOWLEDGE OF STABLE STATE OF PIPELINE RESOURCE WHEN FREEZE BIT SET AND CONTEXT SWITCH INHIBITED

(75) Inventors: Lincoln G. Garlick, Santa Clara, CA (US); Vikramjeet Singh, Fremont, CA (US); David W. Nuechterlein, Longmont, CO (US); Shail Dave, San Jose, CA (US); Jeffrey M. Smith, Union City, CA (US); Paolo E. Sabella, San Francisco, CA (US); Dennis K. Ma, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 76 days.

(21) Appl. No.: 11/553,913

(22) Filed: Oct. 27, 2006

(51) Int. Cl.
*G06F 11/30* (2006.01)
(52) U.S. Cl. ........................................ 712/228; 714/47
(58) Field of Classification Search ................. None
See application file for complete search history.

(56) References Cited

U.S. PATENT DOCUMENTS 6,425,122 B1 * 7/2002 Klingman ................... 717/124
6,754,837 B1 * 6/2004 Helms ........................ 713/322
6,779,122 B2 * 8/2004 George et al. ............... 713/330
7,028,197 B2 * 4/2006 Subramanian et al. ...... 713/310

\* cited by examiner

*Primary Examiner*—Kenneth S Kim
(74) *Attorney, Agent, or Firm*—Townsend and Townsend and Crew (57) ABSTRACT

Software can freeze portions of a pipeline operation in a processor by asserting a predetermined freeze register in the processor. The processor halts operations relating to portions of a common pipeline processing in response to an asserted freeze register. Processor resources that operate downstream from the common pipeline continue to process any scheduled instructions. The processor is prevented from initiating any context switching in which a processor resource is allocated to a different channel. The processor stops supplying any additional data to downstream resources and ensures that the interface to downstream resources is clear of previously sent data. The processor prevents state machines from making additional requests. The processor asserts an acknowledgement indication in response to the freeze assertion when the processing has reached a stable state. Software is allowed to manipulate states and registers within the processor. Clearing the freeze register allows processing to resume.

18 Claims, 4 Drawing Sheets

INDICATING ACKNOWLEDGE OF STABLE STATE OF PIPELINE RESOURCE WHEN FREEZE BIT SET AND CONTEXT SWITCH INHIBITED

BACKGROUND

A processor can typically support multiple applications or processes in a time sliced manner. The processor may also include multiple resources that can be independently scheduled and allocated to support particular processes. The multiple processor resources may have the capability to concurrently support distinct applications that access the processor during distinct time slices.

The processor controls the allocation of its independent resources based on application needs and resource availability. Some internal processor resources may be shared among multiple applications, while other resources may occasionally support just one active application.

However, each individual application accessing the processor is likely unaware of any other applications that are accessing the processor. Typically, the processor appears to each individual application as being dedicated to the particular application.

There may be additional supervisory applications that are distinct from the applications accessing the processor. The supervisory applications may, for example, control system level applications, such as how the individual applications operate in a computer system. There may be conditions in which the supervisory applications desire to access the various resources within the processor to monitor or modify data, information, or even resource allocations within the processor. For example, a supervisory application may decide to prematurely terminate an application executing within the processor. In another example, the supervisory application may correct an error in data, resources, or states within the processor related to a particular application.

The ability of the supervisory application to access, monitor, or modify particular processor locations or resources is complicated by each application's inability to determine processor resources allocated to another application. Additionally, because the processor may determine the timing and access to the various resources, the supervisory application cannot be assured that the processor or any processor resource is in a particular state at a particular time while work for applications is in progress.

The ability of a supervisory application to access and monitor or modify information and resources within the processor is advantageous in situations where a processor supports numerous independent applications. The ability to access and modify processor data and resources can contribute to system stability.

SUMMARY

A processor with supporting multiple channels in a time slice fashion can asynchronously schedule the various resources within the processor to one or more of the channels. A particular resource allocated to a channel is configured to support a context, where the resource context does not necessarily align with the active channel. The processor can time slice the various resources in a manner that does not align with the time slicing of the channels. The context switching of processor resources complicates the ability of software to stop individual operations within the processor to examine states and register values. Some states and register values may correspond to the desired context, while other processor resources may have switched to another context.

Software can freeze portions of a pipeline operation in a processor by asserting a predetermined freeze register in the processor. The processor halts operations relating to portions of a common pipeline processing in response to an asserted freeze register. Processor resources that operate downstream from the common pipeline continue to process any scheduled instructions. The processor is prevented from initiating any context switching in which a processor resource is allocated to a different channel. The processor stops supplying any additional data to downstream resources and ensures that the interface to downstream resources is clear of previously sent data. The processor prevents state machines from making additional requests. The processor asserts an acknowledgement indication in response to the freeze assertion when the processing has reached a stable state. While in the stable state, software is allowed to safely manipulate states and registers within the processor. Clearing the freeze register allows processing to resume.

Aspects of the invention include a method of freezing at least a portion of pipeline processing within a processor supporting multiple independent resources from a common pipeline. The method includes determining assertion of at least one bit of a freeze register within the processor, determining, based on the at least one bit, a level of freeze, inhibiting processing of at least one common pipeline process within the processor based on the level of freeze, and asserting an acknowledge indication.

Aspects of the invention include a method of freezing at least a portion of pipeline processing within a processor supporting multiple independent resources from a common pipeline. The method includes determining assertion of at least one bit of a freeze register within the processor, inhibiting context switching of downstream resources within the processor, preventing further flow of information from a common FIFO to the downstream resources, inhibiting further requests from at least one state machine within a common pipeline portion of the processor, and acknowledging a freeze state.

Aspects of the invention include an apparatus for freezing at least a portion of pipeline processing within a processor supporting multiple independent resources from a common pipeline that includes a freeze register configured to receive a write of at least one predetermined freeze bit, and a state monitor to determine assertion of the at least one predetermined freeze bit, initiate a freeze operation in at least one common pipeline processing portion, and configured to assert at least one acknowledge bit in an acknowledge register.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Methods and apparatus are described herein for freezing at least a portion of a processor to permit software to access, monitor, or modify data, states, and resources within the processor. The processor can permit different levels or hierarchies of process freezes. The processor can dedicate one or more bits, registers, or memory locations to supporting the multiple freeze levels.

The processor can monitor the freeze registers for assertion of a freeze signal. The processor halts, terminates, or otherwise limits processor operations based on the level of the asserted freeze. For example, at one level, the processor can freeze a common FIFO processing portion of the processor while allowing previously scheduled resources to continue processing. In another freeze level, the processor can prevent the resources from being reallocated to a different application from the one that they are supporting at the time of the freeze.

When initiating a freeze, the processor can prevent scheduled resources from switching a context that is supported. The processor prevents further data and instructions from flowing to resources that are downstream for the portion that is halted. If data or instructions are presently being sent to downstream resources, the processor allows them to complete and verifies completion.

The processor also prevents any state machines in the frozen portion from making further requests, but if requests are outstanding, the processor verifies their completion. Each state machine can indicate that it has reached a stable state.

The processor asserts an acknowledge indicator once the downstream instruction flow is complete and the state machines have reached a stable state. At this point, the frozen portion of the processor is stable and software can access the processor to determine processor states, memory and register values, and is able to make revisions if desired.

Once software control of the frozen processor is complete, the software can clear the appropriate freeze register. The processor can determine that the freeze is terminated and can resume processing. The processor may have no knowledge of changes made by the software during the frozen state.

Figure 1:
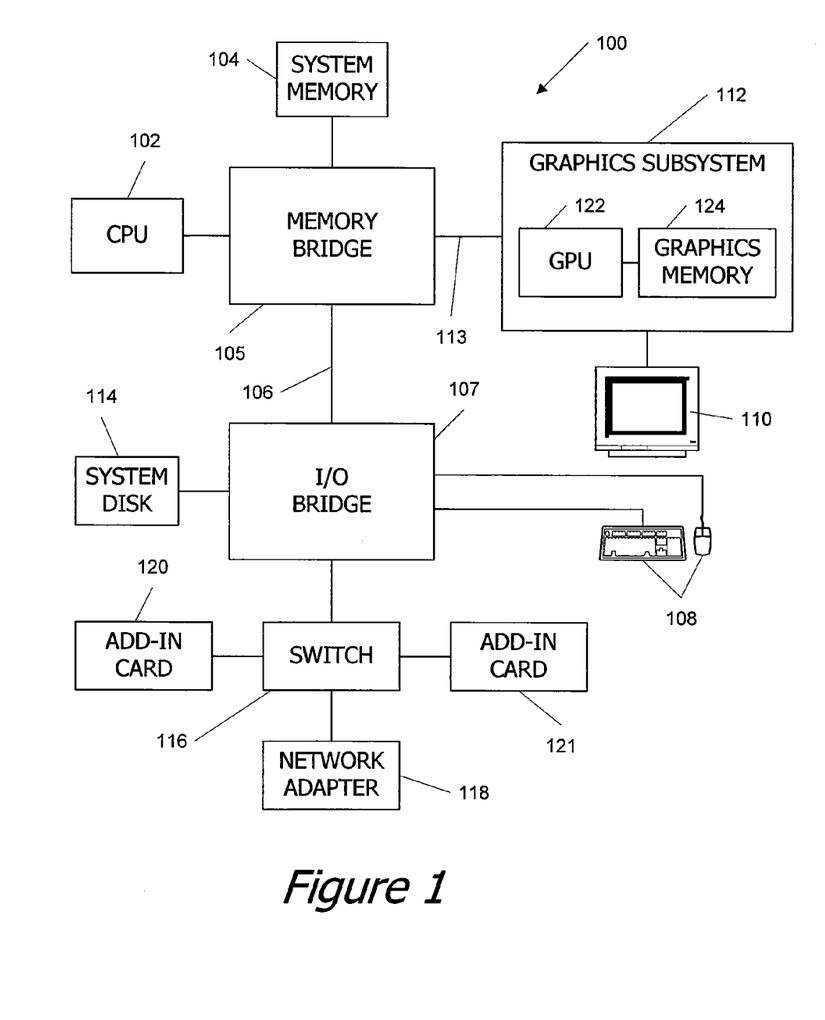
FIG. 1 is a simplified functional block diagram of an embodiment of a computer system.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, hand-held devices such as mobile phones or personal digital assistants, and so on.

Figure 2:
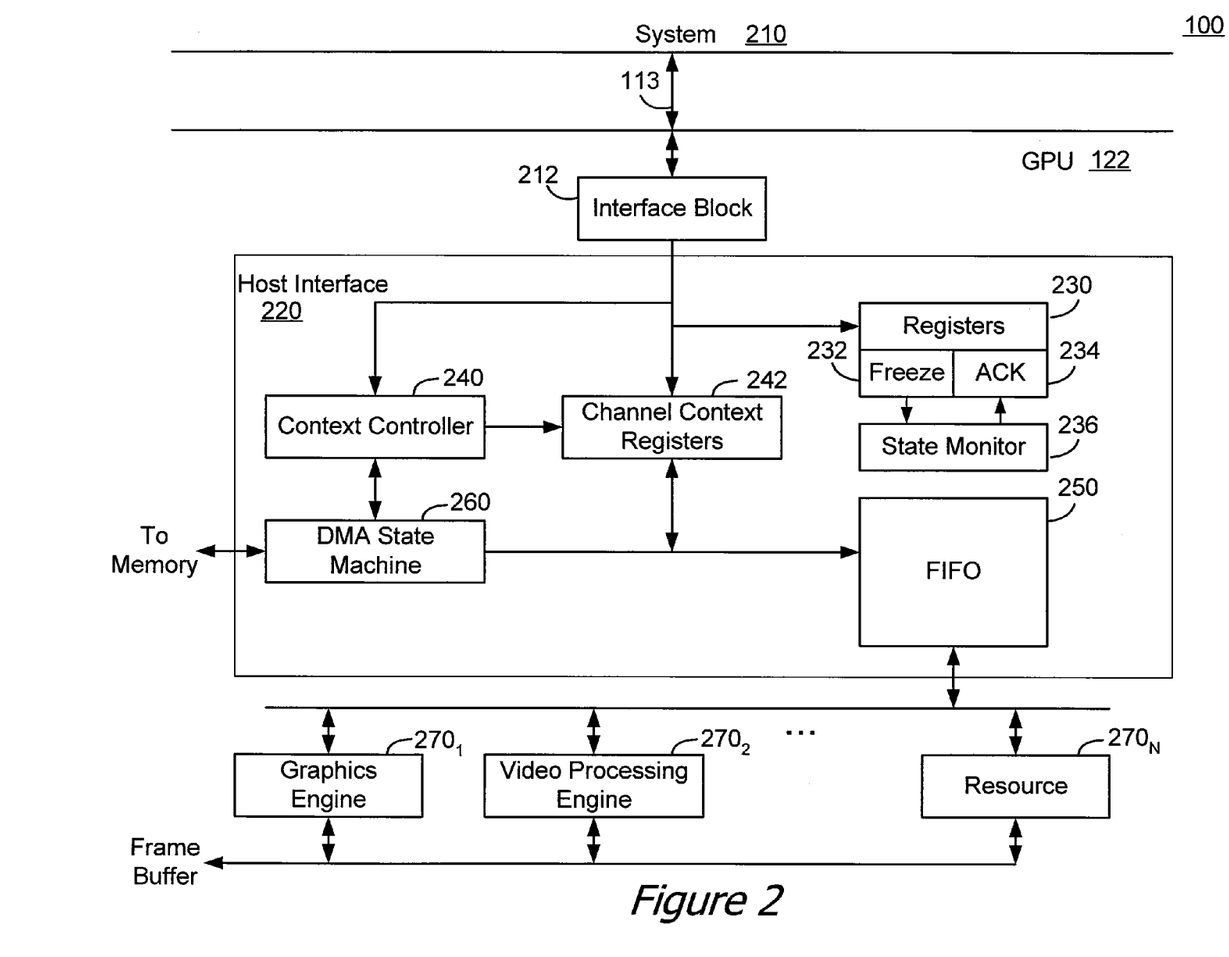
FIG. 2 is a simplified functional block diagram of an embodiment of a portion of a computer system.

FIG. 2 is a simplified functional block diagram of a portion of the computer system of FIG. 1. The functional block diagram provides additional details into the GPU related to freezing a portion of the processor, such as the portion related to common pipeline processing.

The computer system 100 includes a system 210 interfacing with a GPU 122 via an interface bus 113. The system 210 can include, for example, a general purpose processor executing one or more host applications from memory. The system can also include, for example, one or more devices that are configured to access the GPU 122 independent of the general purpose processor. The system 210 can also include one or more supervisory applications that executes on a general purpose processor and that executes above each of the host applications. The supervisory application can be, for example, part of an operating system or supervisory driver associated with the general purpose processor.

Each one of the host applications or devices in the system can be the source of one or more channels requesting processing resources from the GPU 122. Each channel access the GPU 122 using the interface 113. The GPU 122 includes an interface block 220 that is configured to convert information to and from the interface bus 113 to an from, respectively, the communications protocol used on the interface bus 113.

The GPU 122 communicates with and services the various channels in a time sliced manner. However, GPU 122 can concurrently process data and information from multiple channels. A host interface block (HIB) 220, alternatively referred to by the shorthand term "host", controls the communications with the system 210 and controls the time slicing of channel access.

For each active channel, the HIB 220 determines what downstream resources within the GPU 122 are required or otherwise requested. The HIB 220 determines which of multiple substantially independent GPU resources to allocate to the channel. In the embodiment shown in FIG. 2, the independent downstream resources are generally depicted as engines, e.g. 270₁. However, the downstream resources are not limited to engines, but can be some other independently allocatable resources, e.g. 270_N.

The HIB 220 performs the common processing of data and instructions that are supplied to a FIFO 250. The contents of the FIFO 250 can be routed to the appropriate pipeline buffers for the scheduled downstream engines or resources.

The HIB 220 includes a register bank 230. The contents of the register bank 230 can be common to all resources of the GPU 122 and are not dedicated to any particular resource, engine, or context. One or more freeze registers 232 may be part of, or associated with the register bank 230.

The freeze registers 232 include one or more bits or register locations that can be written to selectively assert or clear a processor freeze state. A supervisory application running on a processor within the system can assert or clear the bits in the freeze registers. For example, the freeze registers 232 can include multiple freeze bits, each corresponding to a distinct freeze state. In a first freeze state, the common processing related to the FIFO 250 contents is frozen. In a second freeze state, context switching of the resources downstream from the HIB 220 is inhibited. That is, the present context of each of the downstream resources is frozen.

One or more ACK registers 234 can be part of, or associated with the register bank 230. The contents of the ACK registers 234 can be controlled by a state monitor 236. The state monitor 236 initiates the processor freeze based on the contents of the freeze registers 232. The state monitor 236 also monitors the state of the hardware within the HIB 220 and determines when the host interface block has reached the frozen state. The state monitor 236 asserts the appropriate bit or bits in the corresponding ACK register 234 to indicate to the system 210 the frozen state.

The HIB 220 includes channel context registers 242 that include one or more registers that are configured to receive the information and data used to configure a particular downstream resource for a context. Some of the channel context registers 242 can be written by the application seeking access to the resource, while other portions of the channel context registers 242 are determined by a context controller 240.

The context controller 240 can operate on the instructions provided by an active channel to determine which of the downstream resources are requested. The context controller 240 can determine if one or more downstream resources need to be context switched to support the channel. The context controller 240 can write the appropriate values to the channel context registers to context switch the resource and configure it for the appropriate context.

A DMA state machine 260 can operate on one or more instructions from the context controller 240 or from the active channel. The DMA state machine 260 can interface with memory (not shown) to read or write data. The DMA state machine 260 in conjunction with the context controller 240 can write, for example, the data and instructions to the FIFO 250 for delivery to one or more downstream resources.

The HIB 220 can include additional state machines or controllers that are not shown in FIG. 2 for the sake of clarity. For example, a scheduler (not shown) may distribute the contents of the FIFO 250 to the appropriate pipeline buffers in the downstream resources. A timer or counter (not shown) can be used to track the time slice allocated to a particular channel. A time-out or count can direct the HIB 220 to deactivate the current channel in favor of another channel seeking access to the GPU 122.

The downstream resources 270₁-270_N includes engines and other processing resources that can be independently scheduled and that can substantially execute independently. The downstream resources 270₁-270_N can include graphics engine 270₁, video processing engine 270₂, as well as other resources. The graphics engine 270₁, and video processing engine 270₂, for example, can operate concurrently in different contexts. Each of the downstream resources 270₁-270_N can be context switched to support multiple contexts.

The GPU 122 permits a software application in the system 210 to initiate a freeze by writing to the appropriate locations in the freeze registers 232. The hardware within the HIB 220 acts on the asserted freeze bits to initiate freezing of the appropriate portions within the GPU 122. The state monitor 236 determines when each of the portions of the GPU 122 have reached a freeze state and asserts the appropriate ACK bits in the ACK registers 234 to indicate to the system 210 that the freeze state has been reached.

Controlling the freezing of GPU resources using hardware within the GPU 122 permits a more structured transition to the freeze state. Each portion's transition to the freeze state is not independently reliant on instructions or operations by the supervisory application in the system 210.

Figure 3:
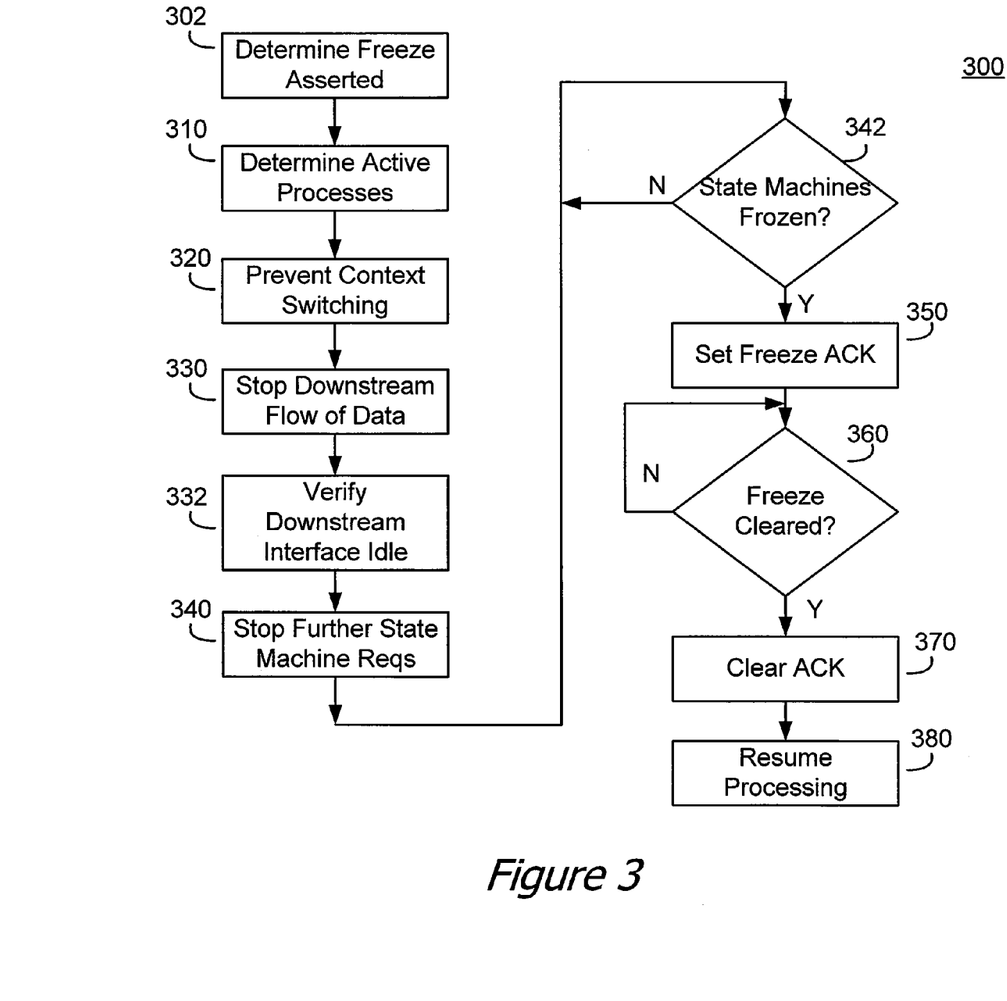
FIG. 3 is a simplified flowchart of an embodiment of a method of freezing common pipeline processing.

FIG. 3 is a simplified flowchart of an embodiment of a method 300 of freezing common pipeline processing within the GPU. The method 300 can be executed by the host interface block of the GPU of FIG. 2 to freeze some or all of the common pipeline processing performed within the host interface block.

The method 300 begins at block 302 where the host interface block (HIB) determines that a freeze register has been asserted. The bits of a freeze register can correspond to a particular freeze level requested by a system application, such as a supervisory application. The state monitor in the HIB can determine that a freeze bit has been asserted and can initiate the freeze processing.

The HIB proceeds to block 310 and determines which channel or process is presently active. The HIB will determine the operating contexts and may determine if the present channel represents the same or a different context from the ones presently executing on downstream resources.

The HIB proceeds to block 320 and prevents any context switches from initiating. The state monitor can, for example, inhibit context switching by the context controller. If the context controller has already initiated a context switch, the context switching of the resources is completed, but no new context switches are initiated. The context controller reports its state to the state monitor. The context controller can, for example, report the presence or absence of context switching to the state monitor.

The HIB proceeds to block 330 and stops further flow of instructions and data to the downstream resources. The HIB can, for example, freeze the FIFO such that no new information appears when the oldest information is extracted from the FIFO. In another embodiment, the HIB, via the state monitor, can freeze any scheduler, controller, or state machine that is used to route the FIFO information to the desired downstream resources.

Once the HIB has stopped the flow of downstream resources, the HIB proceeds to block 332 to verify that the interface between the FIFO and the downstream resources is idle and has serviced all previously launched to downstream resources. The HIB may allows several FIFO instructions or data to be initiated to their downstream destinations, and may not know whether the information is received at the downstream resource. The HIB can receive, for example, an acknowledge, read a flag, or otherwise determine that information was received by the downstream destination resources. The state monitor can determine if the interface is idle. If the interface is idle, there is no more information in transit to the downstream destinations.

The HIB proceeds to block 340 and stops or otherwise prevents any additional state machine requests. For example, the state monitor can control the DMA state machine to prevent any additional memory requests. The state monitor can similarly inhibit further requests from any other state machines within the HIB.

The HIB proceeds to decision block 342 to determine whether all relevant state machines have achieved a frozen or otherwise stable state. For example, the state monitor can inhibit requests by the DMA state machine, but the DMA state machine may have already launched a request for which a response is pending.

The state monitor can verify that the state machine processing is frozen or otherwise at a stable state by monitoring a state indicator from each of the state machines. Typically, each state machine reports when it is in an idle state. The state monitor verifies that all relevant state machines are in a stable or frozen state when all relevant idle states are asserted. If not all of the idle states are active, the state monitor returns to decision block 342 to wait for all state machines to return an idle indication.

The HIB proceeds from decision block 342 to block 350 once all state machines are idle or frozen. The state monitor within the HIB can assert the appropriate ACK bit of the ACK register to indicate that a stable frozen state has been achieved. The HIB need not freeze operation of the entire GPU. For example, the downstream resources are not frozen, but will continue to process the instructions that have already been scheduled within their respective pipeline registers. Eventually, the downstream resources may exhaust the pipeline and transition to an idle state.

The supervisory application initiating the freeze may poll the freeze register to determine when the freeze ACK is returned by the GPU. Once the supervisory application determines that the GPU has reached a stable frozen state, the software application can access the registers within the GPU to monitor or modify its contents.

For example, a supervisory application may initiate a GPU freeze upon detecting an error state occurring in an application. The error in the application may trigger, for example, an interrupt. The interrupt service routine (ISR) may be the supervisory application that initiates the GPU freeze. The ISR may write the freeze bit or bits to the register in the GPU and may poll the ACK register for the acknowledgement.

Once the GPU has reached the frozen state and the ISR receives the ACK, the ISR can access the registers in the host interface block of the GPU and can monitor or modify the contents. In one example, the ISR can terminate a process within the GPU.

In the frozen state reached in the method 300 of FIG. 3, the GPU does not service any applications. The GPU proceeds to decision block 360 and the state monitor monitors the freeze register to determine if the freeze state is cleared by the supervisory application.

If the freeze state is not cleared, the HIB returns to decision block 360 to monitor the freeze register and wait for it to clear. If the freeze register is cleared, the HIB proceeds from decision block 360 to block 370.

The state monitor clears the ACK register and the HIB proceeds to block 380 where the GPU processing resumes. The GPU may have no knowledge of any changes that may have been initiated by the supervisory application. The GPU resumes processing based on the contents of the HIB registers and the FIFO contents as they appear upon release from the frozen state.

Figure 4:
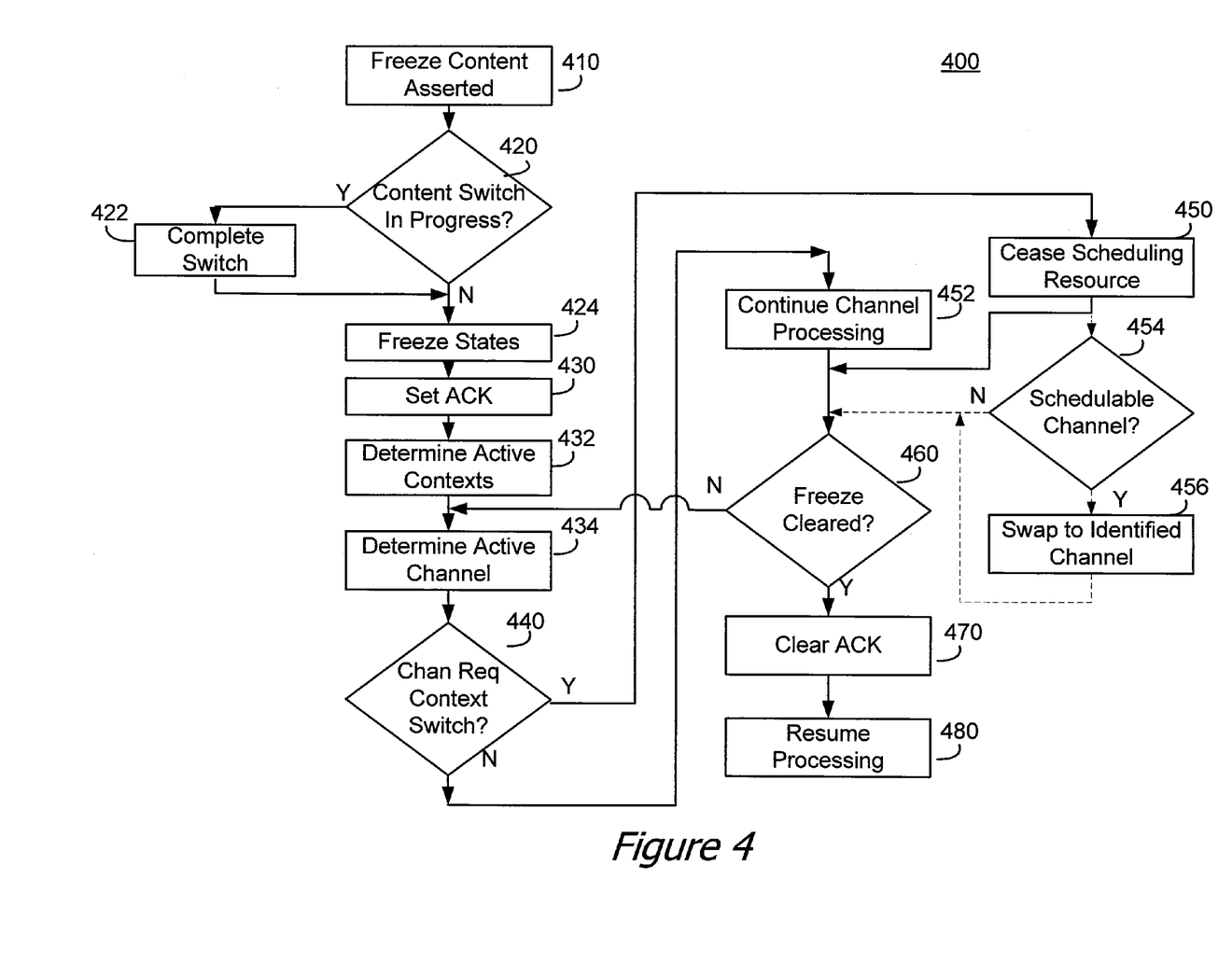
FIG. 4 is a simplified flowchart of an embodiment of a method of freezing a context of a processor.

FIG. 4 is a simplified flowchart of an embodiment of a method 400 of freezing a context of a processor. In contrast to the method of FIG. 3, the method 400 of FIG. 4 does not result in the entire HIB operation freezing. Instead, the HIB only freezes the present contexts of the downstream resources and may even allow additional processing of channels after reaching the frozen state. The method 400 can also be performed by the HIB in the GPU of FIG. 1 or 2.

The method 400 begins at block 410 where the HIB determines that a freeze command has been received. The state monitor can determine that a predetermined bit in the freeze register has been written to by an application.

The HIB proceeds to decision block 420 to determine if a context switch is already in progress. If so, the HIB proceeds to block 422 and allows the context switch to complete. The HIB proceeds from block 422 to block 424. If the HIB determines at decision block 420 that no context switch is in process, the HIB proceeds to block 424.

At block 424, the HIB freezes the contexts by inhibiting further context switching. The HIB can, for example, inhibit further context scheduling tasks, or perhaps further writes to the channel context registers. The HIB or state monitor can also inhibit or defer further instructions sent by the CPU to the context scheduler and controller.

After freezing the downstream resources to their present contexts, the state monitor in the HIB can assert the appropriate ACK bit in the ACK registers. A software application polling the register can determine that context switching within the GPU is frozen and that the processes running inside the GPU will not be switched while the ACK remains asserted.

The GPU can continue to process and support channel instructions, provided they do not require a context switching of any downstream resources. The HIB can proceed to block 432 and determine the active contexts for each of the downstream resources.

The HIB proceeds to block 434 and determines the active channel, where the active channel corresponds to the application presently granted access to the GPU. The active channel may not correspond with all of the contexts presently active within the GPU. The GPU continues to receive instructions from the active channel and processes them so long as a context switch is not required.

The HIB proceeds to decision block 440 and determines if the instruction from the channel requires a context switch of one or more downstream resources. If so, the HIB proceeds to block 450 and ceases scheduling of that resource. Because the HIB is in a context frozen state, the HIB cannot schedule any resource that needs to be context switched prior to servicing an instruction.

The HIB can be configured to cease scheduling of any further instructions upon determining a request to change contexts. Optionally, the HIB can be configured to search for other channels that permit further processing without context switching of a downstream resource. These two alternative embodiments are illustrated in FIG. 4.

In a first embodiment, the HIB ceases to schedule any further instructions. The HIB proceeds from decision block 440 to decision block 460. In this embodiment, processing of instructions for any context has now ceased because HIB is also not allowed to channel switch out its currently active context.

In a second embodiment, the HIB proceeds from decision block 440 to decision block 454, where the HIB searches the schedulable channels for any channel having instructions that can be processed without causing a context switch to a downstream engine. If there are such channels, HIB proceeds to block 456 and channel swaps in one such channel. The HIB then proceeds to decision block 460. If there are no such channels available, proceed from decision block 454 to decision block 460.

The HIB proceeds to block 452 from decision block 440 if the present instruction does not require a context switch. At block 452, the HIB continues to schedule the instruction and the GPU continues to process the newly scheduled instructions using the downstream resources.

The HIB proceeds to decision block 460 to determine if the freeze register is cleared. For example, the state monitor can determine that the supervisory application has cleared the freeze register. If the freeze register has not been cleared, the HIB returns to block 434 to determine the active channel and the instruction for the active channel.

If the HIB determines that the freeze register has been cleared, the HIB proceeds to block 470 and the state monitor clears the ACK bit in the ACK register. The HIB proceeds to block 480 and resumes processing of the active channel without any constraints related to context switching.

Methods and apparatus for freezing common pipeline processing within a processor with an acknowledge have been described herein. The methods and apparatus enable a register access to a processor for initiating one of multiple possible freeze levels. The processor internally proceeds to a stable frozen state before acknowledging the freeze. A software application polling for the acknowledgement can be assured of a stable state upon detection of the acknowledgement.

The external software need not have any knowledge of the internal states, registers, or processing hierarchies within the processor to effectuate a stable freeze of the common pipeline processing. Downstream processing that is already scheduled at the time the freeze register is asserted continues to process.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of freezing at least a portion of processing within a processor supporting multiple independent resources from a common pipeline, the method comprising:
   determining assertion of at least one bit of a freeze register within the processor;
   determining, based on the at least one bit, a level of freeze;
   inhibiting processing of at least one common process within the processor based on the level of freeze by inhibiting further context switching of resources within the processor; and
   asserting an acknowledge indication.

2. The method of claim 1, wherein determining the level of freeze comprises determining a full common processing freeze based on the at least one bit.

3. The method of claim 1, wherein determining the level of freeze comprises determining a context switching freeze based on the at least one bit.

4. The method of claim 1, wherein inhibiting processing of at least one common process comprises:
processing previously initiated context switching to a context.

5. The method of claim 1, wherein inhibiting processing of at least one common process comprises:
preventing information flow from a FIFO buffer in the processor to downstream resources; and
determining an idle state of an interface to downstream resources.

6. The method of claim 1, wherein inhibiting processing of at least one common process comprises:
inhibiting further requests from state machines in a common pipeline portion of the processor; and
waiting for a stable indication from each state machine in the common pipeline portion.

7. The method of claim 1, further comprising:
monitoring an asserted freeze register for clearing of the at least one bit; and
clearing the acknowledge indication upon determining clearing of the at least one bit.

8. The method of claim 7, further comprising resuming common processing.

9. A method of freezing at least a portion of processing within a processor supporting multiple independent resources from a common pipeline, the method comprising:
determining assertion of at least one bit of a freeze register within the processor;
inhibiting context switching of downstream resources within the processor;
preventing further flow of information from a common FIFO to the downstream resources;
inhibiting further requests from at least one state machine within a common pipeline portion of the processor; and
acknowledging a freeze state.

10. The method of claim 9, wherein inhibiting context switching comprises completing in process context switching.

11. The method of claim 9, wherein preventing further flow of information comprises verifying a downstream interface is in an idle state.

12. The method of claim 9, wherein acknowledging the freeze state comprises writing a bit to an acknowledge register.

13. An apparatus for freezing at least a portion of processing within a processor supporting multiple independent resources from a common pipeline, the apparatus comprising:
a freeze register configured to receive a write of at least one predetermined freeze bit;
a context controller configured to inhibit context switching of downstream resources coupled to the processor in response to the assertion of the at least one predetermined freeze bit; and
a state monitor to determine assertion of the at least one predetermined freeze bit, initiate a freeze operation in at least one common processing portion, and configured to assert at least one acknowledge bit in an acknowledge register.

14. The apparatus of claim 13, further comprising a state machine configured to inhibit further requests following the assertion of the at least one predetermined freeze bit.

15. The apparatus of claim 14, wherein the state machine indicates a frozen state to the state monitor when all pending requests have been returned.

16. The apparatus of claim 13, wherein the state monitor is configured to assert the at least one acknowledge bit after determining an idle state of an interface to downstream resources.

17. The apparatus of claim 13, wherein the state monitor is configured to inhibit further information flow from a common FIFO pipeline to downstream resources.

18. The apparatus of claim 13, wherein the state monitor is configured to monitor the freeze register for clearing of the at least one acknowledge bit in the acknowledge register.

\* \* \* \* \*